United States Patent [19]

Cousimano

[11] 4,302,935
[45] Dec. 1, 1981

[54] ADJUSTABLE (D)-PORT INSERT HEADER FOR INTERNAL COMBUSTION ENGINES

[76] Inventor: Robert D. Cousimano, 8335 Lyndora St., Downey, Calif. 90242

[21] Appl. No.: 117,122

[22] Filed: Jan. 31, 1980

[51] Int. Cl.³ .......................... F01N 7/08; F02F 1/00
[52] U.S. Cl. ................................ 60/272; 123/193 H; 138/39
[58] Field of Search ................ 123/193 H; 138/39; 60/272; 29/156.4 R, 401.1; 415/DIG. 3

[56] References Cited

U.S. PATENT DOCUMENTS

| 2,578,932 | 12/1951 | Hinze | 60/272 |
| 3,422,805 | 1/1969 | Dzianott | 123/193 H |
| 3,623,511 | 11/1971 | Levin | 138/39 |
| 4,159,073 | 6/1979 | Liller | 138/39 |
| 4,195,475 | 4/1980 | Rao | 123/193 H |
| 4,228,653 | 10/1980 | Sperry | 123/193 H |

FOREIGN PATENT DOCUMENTS

| 52-17108 | 2/1977 | Japan | 60/272 |
| 333443 | 8/1930 | United Kingdom | 415/DIG. 3 |

Primary Examiner—Douglas Hart
Attorney, Agent, or Firm—William H. Maxwell

[57] ABSTRACT

Individually adjustable D-port inserts for securement to an engine header and projecting therefrom into exhaust ports to occupy the stagnation areas thereof and in each instance placeable for fine tuning thereof to optimize flow, and removeable with the header without alteration of the exhaust port configuration established thereby.

10 Claims, 5 Drawing Figures

U.S. Patent    Dec. 1, 1981    4,302,935
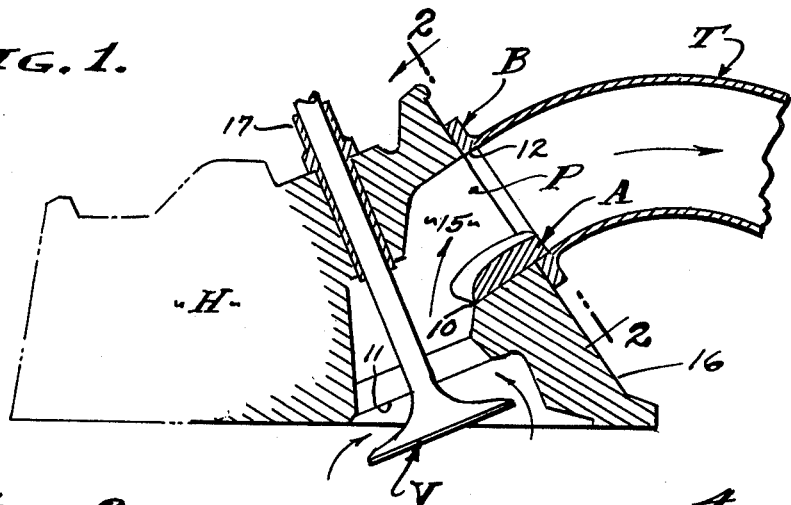
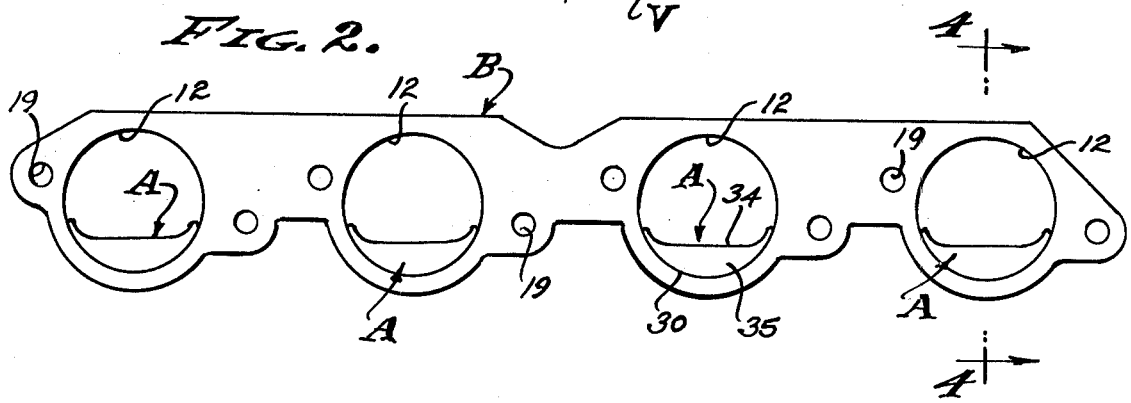
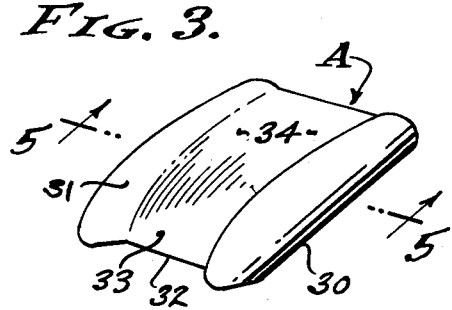
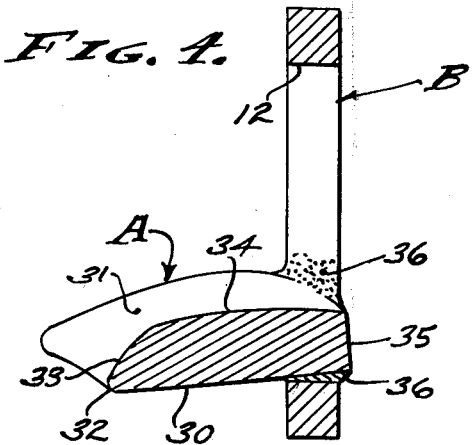
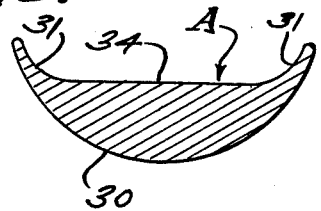

ADJUSTABLE (D)-PORT INSERT HEADER FOR INTERNAL COMBUSTION ENGINES

BACKGROUND

The power of internal combustion engine, Otto Cycle in particular, is directly proportional to the amount of air-fuel mixture which is drawn into and retained within the cylinder for ignition, and all of which is affected by the porting which determines the efficiency of induction and exhaust. Both induction and exhaust are to be optimized for highest efficiency, and flow testing with manometers is practiced in order to show the improved or detrimental affects of changes made to, for example, intake and exhaust ports. And tests have shown that finite changes significantly alter the performance of an engine, that is an opening-up or restriction of a port. Generally, the opening-up of the induction porting is to be desired, but even then there are limits to which this may be practiced. However, it is to be observed that exhaust valves are most often smaller than intake valves, and the volumetric capacity of exhaust ports is commensurately smaller. Accordingly, it is an object of this invention to optimize the restriction of exhaust porting, to be measured and/or tested with "flow-bench" manometers, in order to match the induction capabilities and to tune out turbulence that will otherwise produce flow stagnation.

An original factory port in the head of an engine is but a basic approximation of the most desirable configuration therefor. And there are sophisticated methods of improving these ports, especially the exhaust ports that require filling-in at sharp bends or turns that restrict flow by causing turbulence and resultant stagnation areas. Heretofore, metal has been deposited into the stagnation areas to fill the same and thereby avoid said turbulent restriction, and it has been found that decided flow improvement results even though the actual cross-sectional area of the exhaust is substantially reduced. These filled exhaust ports of reduced area have become known as "D" ports, and which improve flow 15-20% over a conventional round port. Although such port reduction is known to be highly effective, difficulty arises in the application thereof and the ability to tune the same for the highest performance. Therefore, it is an object of this invention to provide exhaust port restriction in the form of inserts mounted to and positioned by the exhaust manifold or header plate thereof, to most advantageously restrict the exhaust ports, individually.

Heretofore, the customizing of engines by "porting" and so called "blue-printing" has involved the removal and replacement of metal bodies throughout the port areas. There are various welding techniques such as the spraying on of molten metal and that of heliarcing, but all subject to warpage of the head castings to which they are applied. Accordingly, it is an object of this invention to avoid port filling of the head per se, by providing inserts associated with the manifold and its header plate. However, exact placement is essential for fine tuning and to this end this invention provides inserts that are placeable and thereafter securable to the manifold at its header plate. In practice, a bare header plate is mounted with these inserts, one for each port and individually positioned for fine tuning with the aid of manometer readings of a flowbench, and thereafter permanently secured in optimum position for use solely with that head to which they are adjusted for optimum flow. The inserts extend from the header plate at the interface with the head and project into the exhaust ports to occupy the stagnation areas thereof.

SUMMARY OF INVENTION

This invention relates to high performance internal combustion engines and particularly those operating on the Otto Cycle wherein an air-fuel mixture is induced into the cylinder for compression and ignition, and subsequent exhaust of the working fluid and products of combustion. Engines of this type have been restrictive exhausts, but restriction as a result of port turbulence is to be avoided, as stagnation areas caused thereby results in inefficient flow. In this respect, resort has been made to filling such stagnation areas, but fraught with the problems of access and the application of heat that causes warping and which is generally destructive to the head. Accordingly, this invention replaces welding of and/or any modification of the head in this respect, with manifold attachments in the form of inserts that enter into the ports of the head to advantageously change the cross sectional shape and occupy the stagnation areas as caused by sharp turns. It appears that sharp turns in the exhaust ports of mass produced engine heads are subject to certain inefficiencies, due to the development of stagnation areas immediately following said turns and at the interface joinder with the exhaust header. Since the slightest variation in port configuration has a great effect at this point of joinder and entering the head to the point of bend or turn in the port, it is not feasible to have a single placement of the insert for most efficient flow. However, the adjustable placement of a single insert configuration is feasible with the present invention, wherein the inserts are individually positioned within each port and thereby tuned for the highest efficiency respectively. In practice, the ultimate securement means is by welding to the header plate prior to securement of the exhaust header tubes thereto.

The foregoing and other various objects and features of this invention will be apparent and fully understood from the following detailed description of the typical preferred form and application thereof, throughout which description reference is made to the accompanying drawings.

DESCRIPTION OF THE DRAWINGS

FIG. 1 is a fragmentary view taken through the exhaust area of an engine head, showing the exhaust valve and exhaust port with the insert-header of the present invention attached.

FIG. 2 is a view of the header taken as indicated by line 2—2 on FIG. 1.

FIG. 3 is a perspective view of the insert.

FIG. 4 is an enlarged section of the insert-header combination taken as indicated by line 4—4 on FIG. 2. And, FIG. 5 is sectional view taken as indicated by line 5—5 on FIG. 3.

PREFERRED EMBODIMENT

Referring now to the drawings, the exhaust valve V and associated port P is shown with the insert A of the present invention mounted to the header plate B so as to project into the port and occupy the stagnation area that follows the sharp turn 10 immediately above the valve seat 11. The header tube T extends from the plate B in the usual manner, all as illustrated in FIG. 1 of the drawings. The valve V is shown lifted (or depressed)

from the seat 11 a distance which is usual for maximum flow. A four port manifold header plate B is shown if FIG. 2, and with the inserts A mounted therein at each port opening 12 thereof. And FIG. 4 is significant in that it illustrates the insert installation as mounted by welding onto the header plate B independently of the head H of the engine and prior to securement of the header tube T.

The head H closes the upper end of the engine cylinder or block (not shown) and is chambered to have an exhaust passage 15 extending angularly from the valve seat 11 and laterally to open in a port P at a side face 16. A valve guide 17 enters the passage in alignement with the seat 11 and the port P is disposed on an axis substantially normal to the axis of valve T and its guide 17. In practice, the lower side of the exhaust passage 15 turns laterally immediately above the seat 11, a definite turn having a sharp corner at 10 and from which point the lower side of passage 15 is substantially straight and normal to the head face 16. The exhaust passage is round in cross section as shown, and the port area thereof adjacent to the head face 16 is of round cylindrical configuration. It is to be understood that many variations occur in heads H of different design, however the sharp turn is prevalent and accompanied by the aforementioned stagnation area extending to the plane of face 16.

The exhaust header for such a head is comprised of a plate B such as that shown in FIG. 2 and from which the exhaust tubes T extend as shown in FIG. 1. The header plate B is a flat element of substantial thickness adapted to be bolted to the head H at 19 to the interface of face 16 and sealed as with a gasket (not shown). The tubes T are permanently welded to plate B and each forms a continuation of the exhaust passage 15, or of the port P and opening 12. The fabrication procedures using the insert A next to be described requires welding of the tubes T after welding of the said inserts A in position as shown and adjusted as described.

Referring now to FIGS. 3–5 of the drawings, the active contours of the insert A are shown to comprise a wedge-shaped tongue of arcuate cross section with upwardly curved margins and a sharpened leading edge. The insert is formed to occupy the lower one side of the exhaust passage 15 and port P and has an exterior contour complementary to the cylinder form of the port. As shown, the lower exterior 30 is a straight semicylinder of approximately 120° arc that terminates along sharpened upwardly turned concavely filleted margins 31. The leading edge 32 is adapted to lie contiguously against the lower one side of exhaust passage 15, engageable therewith at the sharp corner 10. The leading edge 32 is followed by a ramp 33 of rounded configuration to be a fair continuation of the preceeding lower wall of passage 15. And the ramp 33 is followed by a flattened wall 34 faired thereto and substantially parallel with the alignment of the bottom exterior 30. The back 35 of the wedge is truncated normal to the wall 34. Variations of the basic form can be made to fit the exhaust ports as they vary in different engine heads H, to adapt to port diameters and cross sectional configurations.

In carrying out this invention, an engine head H to be equipped with the inserts A is installed on a flow bench where test pressure and flow efficiency can be determined by circulating air through the exhaust passage 15. The header plate B is temporarily fastened in working position on the head H and the inserts A adjustably positioned so as to obtain optimum flow, at each port P and opening 12. That is, contiguousness of the insert in the exhaust passage and its most effective adjusted position of extension therein is determined and ensured before permanently welding the individual inserts to the plate B as at 36. As shown in FIG. 4 the header plate B is ready for the application of the exhaust tubes T, the inserts having been fine tuned for most efficient operation with the particular head H to which their adjustment has been optimized.

Having described only a typical preferred form and application of my invention, I do not wish to be limited or restricted to the specific details herein set forth, but wish to reserve to myself any modifications or variations that may appear to those skilled in the art as set forth within the limits of the following claims:

I claim:

1. An individually adjustable D-port insert for securement to an internal combustion engine exhaust header without alteration of the exhaust port-passage in the engine head, and comprising; a wedge-shaped body to extend into and occupy one side portion of the exhaust port-passage and having an exterior substantially complementary to said one side of the exhaust port-passage and with a leading edge to lie substantially contiguous to said one side of the exhaust passage ahead of the exhaust port and interface engagement with the exhaust header to which the insert is fixedly mounted for extension through the exhaust port and into said exhaust passage.

2. The D-port insert as set forth in claim 1, wherein the wedge shape thereof includes a ramp configuration which is a fair continuation of the preceeding exhaust passage at said one side thereof.

3. The D-port insert as set forth in claim 1, wherein the wedge shape thereof includes a rounded ramp configuration which is a fair continuation of the preceeding exhaust passage and followed by a flattened wall which is a fair continuation thereof, said ramp and continuing wall occupying said one side of the exhaust passage extending to said exhaust port.

4. The D-port insert as set forth in claim 1, wherein the exhaust passage and exhaust port in the engine head are of round cross section, and wherein the insert body is of semi-circular cross section with an exterior substantially complementary to the said one side of the exhaust passage and exhaust port.

5. The D-port insert as set forth in claim 1, wherein the insert body has upwardly turned margins to lie contiguous to the opposite sides of the exhaust passage and exhaust port.

6. The D-port insert as set forth in claim 1, wherein the exhaust passage and exhaust port in the engine head are of round cross section, wherein the wedge-shaped insert body is of semi-circular cross section with an exterior substantially complementary to the said one side of the exhaust passage and exhaust port, and wherein the insert body has upwardly turned margins to lie contiguous to the opposite sides of the exhaust passage and exhaust port.

7. The D-port insert as set forth in claim 1, wherein the exhaust passage and exhaust port in the engine head are of round cross section, wherein the wedge shape of the insert includes a ramp configuration which is a fair continuation of the preceeding exhaust passage at said one side thereof, and wherein the body of the insert is of semi-circular cross section with an exterior substantially complementary to the said one side of the exhaust passage and exhaust port.

8. The D-port insert as set forth in claim 1, wherein the exhaust passage and exhaust port in the engine head are of round cross section, wherein the wedge shape of the insert includes a rounded ramp configuration which is a fair continuation of the preceeding exhaust passage and followed by a flattened wall which is a fair continuation thereof, said ramp and continuing wall occupying said one side of the exhaust passage extending to said exhaust port, and wherein the body of the insert is of semi-circular cross section with an exterior substantially complementary to the said one side of the exhaust passage and exhaust port.

9. The D-port insert as set forth in claim 1, wherein the exhaust passage and exhaust port in the engine head are of round cross section, wherein the wedge shape of the insert includes a ramp configuration which is a fair continuation of the preceeding exhaust passage at said one side thereof, wherein the body of the insert is of semi-circular cross section with an exterior substantially complementary to the said one side of the insert has upwardly turned margins to lie contiguous to the opposite sides of the exhaust passage and exhaust port.

10. The D-port insert as set forth in claim 1, wherein the exhaust passage and exhaust port in the engine head are of round cross section, wherein the wedge shape of the insert includes a rounded ramp configuration which is a fair continuation of the preceeding exhaust passage and followed by a flattened wall which is a fair continuation thereof, said ramp and continuing wall occupying said one side of the exhaust passage extending to said exhaust port, wherein the body of the insert is of semi-circular cross section with an exterior substantially complementary to the said one side of the exhaust passage and exhaust port, and wherein the insert has upwardly turned margins to lie contiguous to the opposite sides of the exhaust passage and exhaust port.

* * * * *